US011116198B2

(12) United States Patent
Hauptmann et al.

(10) Patent No.: US 11,116,198 B2
(45) Date of Patent: Sep. 14, 2021

(54) COMPLEX MOSQUITO TRAP FOR OUTDOOR SPACES

(71) Applicant: DIPTERATECH, Cagnes sur Mer (FR)

(72) Inventors: Dominique Hauptmann, Saint Paul de Vence (FR); Gerard Benbassat, Saint Paul de Vence (FR)

(73) Assignee: HBM DISTRIBUTION, Vence (FR)

( * ) Notice: Subject to any disclaimer, the term of this patent is extended or adjusted under 35 U.S.C. 154(b) by 198 days.

(21) Appl. No.: 15/545,622

(22) PCT Filed: Jan. 22, 2016

(86) PCT No.: PCT/FR2016/050132
§ 371 (c)(1),
(2) Date: Jul. 21, 2017

(87) PCT Pub. No.: WO2016/116717
PCT Pub. Date: Jul. 28, 2016

(65) Prior Publication Data
US 2018/0064088 A1 Mar. 8, 2018

(30) Foreign Application Priority Data
Jan. 23, 2015 (FR) ...................................... 1500142

(51) Int. Cl.
*A01M 1/06* (2006.01)
*A01M 1/02* (2006.01)
(52) U.S. Cl.
CPC .............. *A01M 1/06* (2013.01); *A01M 1/023* (2013.01)

(58) Field of Classification Search
CPC .......... A01M 1/00; A01M 1/02; A01M 1/023; A01M 1/04; A01M 1/06; A01M 1/08;
(Continued)

(56) References Cited

U.S. PATENT DOCUMENTS 4,506,473 A * 3/1985 Waters, Jr. ............ A01M 1/023
43/107
4,907,366 A * 3/1990 Balfour ................. A01M 1/023
43/132.1
(Continued)

FOREIGN PATENT DOCUMENTS

EP 3010347 B1 * 8/2017 ............ A01N 59/04
FR 3006855 A1 12/2014
(Continued)

OTHER PUBLICATIONS

Akhoundi, et al., "Effectiveness of a Field Trap Barrier System for Controlling Aedes albopictus: a Removal trapping Strategy", Parasites & Vectors (2018) 11:101.

*Primary Examiner* — Darren W Ark
(74) *Attorney, Agent, or Firm* — Tarolli, Sundheim, Covell & Tummino LLP (57) ABSTRACT

The invention relates to a complex mosquito trap for outdoor spaces which comprises a plurality of individual traps in an array supplied with CO2, comprising in combination a distance between each individual adjacent trap that does not exceed 12 metres, a CO2 flow rate in each individual trap greater than 0.5 g/h per metre of distance between adjacent traps, and the presence of a centralised flow controller and a flow limiter in each trap.

8 Claims, 4 Drawing Sheets

(58) Field of Classification Search
CPC .......... A01M 1/10; A01M 1/106; A01M 1/14;
A01M 1/145; A01M 1/22; A01M 1/223
USPC ................ 43/107, 112, 113, 114, 139, 132.1
See application file for complete search history.

(56) References Cited

U.S. PATENT DOCUMENTS

| | | | | |
|---|---|---|---|---|
| 5,040,326 A * | 8/1991 | Van Dijnsen | ......... | A01M 23/02 43/139 |
| 5,205,064 A * | 4/1993 | Nolen | ................ | A01M 1/023 43/112 |
| 5,241,778 A * | 9/1993 | Price | .................. | A01M 1/023 43/112 |
| 5,311,697 A * | 5/1994 | Cavanaugh | ............ | A01M 1/08 43/107 |
| 5,327,675 A * | 7/1994 | Butler | ................ | A01M 1/023 43/107 |
| 5,382,422 A * | 1/1995 | Dieguez | ............... | A01M 1/023 424/405 |
| 5,417,009 A * | 5/1995 | Butler | .................. | A01M 1/08 43/113 |
| 5,669,176 A * | 9/1997 | Miller | ................. | A01M 1/023 43/107 |
| 5,799,436 A * | 9/1998 | Nolen | ................ | A01M 1/023 43/112 |
| 5,813,166 A * | 9/1998 | Wigton | ............... | A01M 1/023 43/107 |
| 5,870,944 A * | 2/1999 | Vander Zalm | ............ | A23L 2/54 261/DIG. 7 |
| 5,884,697 A * | 3/1999 | Pierron | ............. | B60H 1/00328 165/203 |
| 5,943,815 A | 8/1999 | Paganessi et al. | | |
| 6,272,790 B1 * | 8/2001 | Paganessi | ............ | A01M 1/023 43/107 |
| 6,286,249 B1 * | 9/2001 | Miller | .................... | A01M 1/02 43/113 |
| 6,467,215 B1 * | 10/2002 | Nelson | .................. | A01M 1/023 43/107 |
| 6,530,172 B2 * | 3/2003 | Lenz | .................... | A01M 1/023 43/112 |
| 6,568,123 B2 * | 5/2003 | Nelson | .................. | A01M 1/023 43/107 |
| 6,898,896 B1 * | 5/2005 | McBride | ............... | A01M 1/023 43/107 |
| 6,925,752 B1 * | 8/2005 | Cherry | .................... | A01M 1/02 43/107 |
| RE40,646 E * | 3/2009 | Nelson | .................. | A01M 1/023 43/107 |
| 8,006,432 B2 * | 8/2011 | Durand | .................. | A01M 1/06 43/139 |
| 8,296,993 B2 * | 10/2012 | Modlin | ................. | A01M 29/12 239/102.2 |
| 8,475,783 B2 * | 7/2013 | Prohaska | .............. | A01N 59/04 424/84 |
| 8,898,953 B2 * | 12/2014 | Miller | ..................... | A01M 1/02 43/138 |
| 8,973,299 B2 * | 3/2015 | Durand | .................. | A01M 1/06 43/132.1 |
| 9,192,165 B2 * | 11/2015 | Rose | .................... | A01M 1/023 |
| 9,655,357 B2 * | 5/2017 | James | ................. | A01M 23/14 |
| 10,271,535 B2 * | 4/2019 | Lillamand | ............ | A01M 1/023 |
| 2006/0179708 A1 * | 8/2006 | Garland | ................ | A01M 1/023 43/107 |
| 2009/0232861 A1 * | 9/2009 | Wright | .................... | A01N 59/04 424/405 |
| 2016/0128314 A1 * | 5/2016 | Hauptmann | .......... | A01M 13/00 43/125 |
| 2020/0352151 A1 * | 11/2020 | Plaut | ..................... | A01M 1/023 |
| 2021/0045377 A1 * | 2/2021 | Qin | ....................... | A01M 1/023 |

FOREIGN PATENT DOCUMENTS

| | | | | |
|---|---|---|---|---|
| JP | 2007111005 A * | 5/2007 | | |
| WO | WO-03094611 A2 * | 11/2003 | .............. | A01M 1/02 |
| WO | WO-2004082376 A1 * | 9/2004 | ............ | A01M 1/023 |
| WO | WO-2005072522 A1 * | 8/2005 | ............ | A01M 1/023 |
| WO | WO-2014037694 A3 * | 9/2014 | ............ | A01M 1/023 |

* cited by examiner

COMPLEX MOSQUITO TRAP FOR OUTDOOR SPACES

The invention relates to a complex mosquito trap for outdoor spaces.

Man has long been battling against stinging insects, particularly mosquitoes, which are the cause of irritation and vectors of disease. In the context of the proliferation of mosquitoes, and particularly tiger mosquitoes, it is very important to find effective protection for people against the aggression of mosquitoes in outdoor spaces such as gardens, swimming pools, parks and terraces, without risk to health and respecting the ecosystem.

Both for reasons of comfort and safety, very different solutions, to protect people in outdoor spaces against the aggression of mosquitoes, have been developed. These can be classified in different categories according to their mode of operation.

A first category consists of insecticides in the form of smoke from the slow combustion of supports containing insecticide substances or of aerosols, which kill the mosquitoes present in the diffusion zone and keep the others at a distance but that have the drawback of having a rather unpleasant smell of combustion and of presenting a health risk.

Another category is formed by body repellents, which have the same types of drawbacks: disagreeable to have a generally greasy substance on the skin, plus the health risk.

In addition to the drawbacks mentioned, these solutions are "temporary", their duration of effectiveness being typically a few hours, after which the insecticide must be renewed in order for its effectiveness to last.

Yet another category is to attack the larvae. There are in fact different types of larvicides, which are more or less respectful of ecosystems. They limit the spread of mosquito colonies but in most cases cannot claim to provide complete protection.

Lastly, the category in which the present invention is included is that of adult mosquito traps that attract and capture the female mosquitoes, which are in fact the only ones to sting. In this category, there are numerous models.

The most common models simply use a bait or lure, in most cases composed of fatty acids, the odor of which resembles those emitted by the skin and/or respiration, to attract the mosquitoes. When they approach the trap, a fan draws them in and holds them in a net or a sort of cage from which they cannot escape. This type of trap has the drawback that all species of mosquitoes are not sensitive to the same combinations of fatty acids and moreover the range covered by these traps is relatively short, just a few meters.

The most sophisticated models use several baits. The most effective bait that attracts all species of mosquitoes at a distance of several tens of meters (up to around 70 m) is carbon dioxide (hereinafter abbreviated to $CO_2$). In order to make this type of trap, two sources of $CO_2$ are usually used. This involves either the slow combustion of butane or propane gas, with the aid of a specially designed burner for this purpose (e.g. Mosquito Magnet®, Skeetervac® and Predator®), or bottles of compressed $CO_2$ (e.g. Biogents®). In addition to $CO_2$ bait, bait based on fatty acids whose fumes reinforce the attractive power of $CO_2$ is also used.

Depending on the models, these traps are supposed to cover 500 $m^2$ or 1000 $m^2$, or even 5000 $m^2$. In reality, even with these efficient traps, which in fact trap many mosquitoes, in most cases it is not possible to avoid being stung by mosquitoes in outdoor open spaces where one of these traps is located. The reason is that the mosquito "sources", which can be more than 100 m away from the spaces covered by the trap, produce mosquitoes continuously and when people are, for example, in the garden where the trap is installed, they will attract the mosquitoes as much as the trap does, and will be stung.

In fact, the above-described traps have the effect of reducing the density of mosquitoes and, in general, reducing the frequency of stings to a ratio that rarely exceeds 50% to 60%. This means that instead of being stung 10 times in an hour, with no protection, you will only be stung 4 to 5 times. The effectiveness of the traps described is therefore not sufficient because they merely destroy mosquitoes without protecting people.

Some manufacturers, such as Biogents®, have proposed a multi-trap solution (called Eisenhans®) supplied by just one $CO_2$ bottle. This increases the mosquito capture rate and slightly reduces the density of mosquitoes but in general only over an area of a few hundred $m^2$. The drawback of this solution is that it does not succeed in totally eliminating mosquito stings.

U.S. Pat. No. 5,943,815, dating back to 1997, discloses a system to deliver carbon dioxide ($CO_2$) into mosquito traps. This system comprises a source of $CO_2$ gas passing through a tube and supplying traps positioned in series.

Furthermore, U.S. Pat. No. 6,467,215, dating back to 2000, discloses a trap system emitting acoustic waves to attract the insects into an area close to the control station. This system also describes individual traps arranged outdoors to deliver $CO_2$ and states that pulsations of $CO_2$ are emitted for about 4-5 minutes every 10 minutes or so by the use of valves. These traps form an external perimeter round an area to be protected and are arranged every 15.24 m (50 feet) to 91.44 m (300 feet).

Lastly, patent US2006/0179708, dating back to 2006, discloses a sophisticated outdoor mosquito trap taking into account the different weather variables and comprising a network of several individual traps supplied with $CO_2$ from a burner, said traps being open or closed depending on the weather variables. No distance is indicated between each trap forming the separation line according to FIG. 2. Neither is the flow of $CO_2$ at the traps indicated, nor is this considered to be an important variable. There is no flow-limiter whatsoever in each trap but only a valve, which can be open or closed, depending on the analysis of the meteorological conditions by the micro-regulator. The purpose of this sophisticated trap is to regulate the opening and closing of the different valves of the individual outdoor traps depending on meteorological conditions.

Reading the prior art shows that existing mosquito trap systems seek to take into account parameters that are increasingly more sophisticated in order to eliminate mosquitoes, this being clearly illustrated by document US2006/0179708 which regulates in each trap and by one valve the passage of $CO_2$ depending on the speed and direction of the wind, rain, humidity and barometric pressure. These systems are not necessarily effective to prevent all stinging and eliminate the mosquitoes.

As the methods used so far are not totally efficient in preventing mosquito stings, and in the context of the increasing proliferation of mosquitoes, particularly the *Aedes albopictus*, known as the tiger mosquito, it has proved important to perfect a new mosquito trap for outdoor spaces which not only destroys mosquitoes but also provides greater protection for people.

The Applicant has surprisingly devised a new mosquito trap that meets this dual objective of destruction and protection, thus providing a real defense for people against the aggression of mosquitoes in outdoor spaces such as gardens, swimming pools, parks and terraces, regardless of meteorological conditions.

The invention consists in a complex mosquito trap for outdoor spaces comprising:

several individual traps in an array supplied with CO2, said individual traps being arranged along a separation line separating the potential mosquito sources from the outdoor spaces to be protected;

a CO2 distribution station comprising the CO2 source and a CO2 control unit distributing CO2 at a constant pressure to the individual traps by an array of tubes and a low-voltage distribution network comprising one or more transformers and electrical wires supplying the individual traps;

the complex mosquito trap comprising in combination:

a distance between each individual adjacent trap not exceeding 12 meters, a CO2 flow in each individual trap exceeding 0.5 g/h per meter of distance between adjacent traps, and the presence of a centralized flow regulator and a flow limiter in each trap.

Surprisingly, the Applicant has discovered that an interdependence of the distance between traps and the flow of CO2 in each trap, up to certain limits of distance and flow, allows an effective technical solution to be reached.

The combination of the technical elements of the complex mosquito trap according to the invention has a surprising dual action against mosquitoes:

an action of eliminating the adult mosquitoes living inside the space to be protected and surrounded or encircled by the assembly of individual traps and an action of protecting, by a mosquito barrier effect that prevents the mosquitoes that come from outside from penetrating the space to be protected.

The result is that it becomes possible to remain outdoors, at any time, in the garden, on a terrace or by a swimming pool, in the height of summer, without fear of being stung and without any other protection apart from that provided by the invention.

Other advantages of the invention are also that this protection against mosquitoes:

is continuous throughout the whole day and for the entire season when mosquitoes are rife, in an automatic fashion and without intervention by the users, gradually leads to the elimination of mosquito colonies living inside the protected perimeter, is risk free for humans and domestic animals, respects the ecosystem of outdoor spaces, and does not require a highly sophisticated system taking into account meteorological variables.

In the present invention, what is meant by:

"outdoor spaces" are spaces such as an open-air swimming pool, terrace or garden;

"individual trap" is a solid device of the appropriate form attracting and catching mosquitoes which, once inside, are unable to escape;

"separation line" is the perimeter or circle delimiting the outdoor space to be protected and thus separating the mosquito source area and the outdoor space area to be protected;

"g/h per meter of distance between adjacent traps" is the flow mentioned in grams per hour and per meter of distance between two traps located next to each other;

"CO2 control unit" is an electronic and pneumatic device enabling the flow of CO2 towards the assembly of traps to be controlled. The electronic device includes a system to program the diffusion of CO2, regulate the flow and, if required, enable remote control and remote surveillance;

"centralized flow regulator" is an electro-pneumatic device that allows the centralized CO2 flow to be adjusted to a desired value. It comprises in particular a central flow limiter. "Centralized" in the description also means "global";

"flow limiter in each trap" is a device located in each trap and designed to ensure a constant and known flow of CO2;

"CO2 distribution station" is the place where the CO2 source is located for the assembly of traps as well as the CO2 control unit;

"CO2 source" is one or two tanks of compressed CO2 or a device enabling CO2 to be produced from ambient air;

"mosquito lure" is a combination of acids in solid or liquid form enabling the diffusion of olfactory and attractive molecules for mosquitoes, mimicking the odor of mammals' skin;

"star distribution array" is an array of tubes leaving the CO2 distribution station and supplying each individual trap with CO2;

"in-series distribution array" is a main tube leaving the CO2 distribution station supplying each of the individual traps with CO2 through a by-pass;

"a low-voltage distribution network" is a network of electrical wires providing a low-voltage supply to each of the individual traps.

A better understanding of the invention will emerge from the accompanying drawings, in which:

FIGS. 4A and 4B represent two models of an individual trap, wherein FIG. 4A shows one compartment and FIG. 4B shows two compartments.

A more detailed description of the present invention now follows. The different technical elements useful in combination to implement the invention are detailed below:

Arrangement of the Traps

The traps are arranged along a separation line surrounding the outdoor spaces to be protected. This line excludes the natural barriers formed by buildings a few meters high (house, building, garage, etc.), which are usually sufficient obstacles to prevent mosquitoes from passing.

Distance Between Traps

The traps thus arranged along this separation line must be sufficiently close to each other for the mosquito barrier effect to be effective. Their optimal distance depends partly on the CO2 flow and partly on the risk of the presence of mosquito sources in one axis or another of the perimeter. In any case, the distance between two adjacent individual traps must not exceed 12 meters.

Thus, the distance between each individual adjacent trap depends on the CO2 flow in each trap and this distance must not exceed 12 meters. An interdependence of the distance between traps and the flow of CO2 in each trap, up to certain limits of distance and flow, is necessary for the technical efficiency of the mosquito trap according to the invention.

In a preferred embodiment, the distance between two adjacent traps is between 5 and 12 meters.

Depending on the density of mosquitoes present inside and outside the space to be protected, the distribution of individual traps along the separation line will be regular or irregular. Preferably, the distribution of individual traps will be irregular in order to take into account the variation in mosquito density, whilst remaining within a distance between two adjacent traps again preferably of between 5 and 10 meters.

The individual traps have a fan capable of creating a suction cone to capture the mosquitoes, as well as a connection to a low-voltage electrical network and to a CO2 distribution network.

CO2 Flow

The CO2 flow in each trap must exceed 0.5 g/h per meter of distance between adjacent traps. The CO2 flow is in the order of 1.5 g/h per meter of average distance between traps of a given device in order to obtain quality protection.

This flow can be reduced, down to 1 g/h per meter, if only the elimination of mosquitoes is required, and provided there is nobody in the outdoor spaces to be protected.

This flow can be increased up to 2.5 g/h per meter, if increased protection is required, for example if a large number of people are present in the outdoor spaces to be protected.

In a given device, the effective distance between traps can vary depending on the risks of the presence of mosquito sources around the separation line. Preferably, the distance between traps can be reduced in the event of a high density of mosquitoes within the limits indicated.

CO2 Distribution Station

As the number of traps can reach several dozen, it is not feasible to have an independent supply for each trap, whether in the form of a butane gas or compressed CO2 bottle or any other source of CO2. The logistics of replacing bottles would be too onerous and costly. The choice of a CO2 distribution station comprising the CO2 source; composed of one or more tanks of CO2 that supply all of the individual traps; is one of the basic characteristics of the invention.

In a preferred embodiment according to the invention, the CO2 source consists of one or two tanks of compressed CO2.

In another embodiment according to the invention, the CO2 source consists of a device enabling CO2 to be produced from ambient air. This embodiment is implemented by the method of catching mosquitoes by the production of CO2 from ambient air as disclosed in the patent application published under number FR 3 006 855. This invention, filed by the Applicant, is mentioned in order to illustrate a potential CO2 source according to the present invention.

CO2 Control Unit

The CO2 control unit can consist of an electro-pneumatic device comprising a micro-controller, a GSM-type (Global system for Mobile communication) remote communication device, perhaps a wifi-type short-distance wireless communication module, electro-valves and sensors, usually located near the CO2 tank(s), enabling the diffusion of CO2 to the trap assembly to be controlled. This unit enables in particular:

programming of CO2 diffusion, in order to regulate consumption, in respect of the presence of mosquitoes and the need for protection;
detecting whether the active CO2 tank is empty in order to switch automatically to the second tank.
transmitting alarms.

In fact, the unit also has a GSM-type connection to be able on the one hand to transmit information and alarms to a remote surveillance station covering the assembly of complex traps and on the other hand to control them remotely.

This unit has pressure and flow sensors and, if required, sensors to check the contents of the CO2 tanks so as to be able to detect any malfunctions (CO2 leaks, a maladjusted reducer, etc.).

In a preferred embodiment according to the invention, the CO2 control unit comprises a global CO2 flow limiter.

Low-Voltage Distribution Network

The trap fans must be electrically powered. For safety reasons, these fans are powered by a low-voltage supply (12V or 24V). At least one low-voltage 220V transformer must therefore be provided. As with the CO2 network, the electrical network can be arranged in a star or in series. In practice, as soon as the number of traps exceeds a few units, it is much cheaper to arrange the traps in series. Since low voltage is used, depending on the distance between the transformer and the last trap, line losses are not inconsiderable, and it may be necessary to distribute several transformers along the array of traps so as to ensure that all of the traps have a sufficient supply voltage for the fans to perform their function of drawing in mosquitoes.

In a preferred embodiment according to the invention, individual traps are powered by a low-voltage supply from an in-series distribution network or a mixed in-series/star distribution network. This low-voltage distribution network can follow the network of tubes distributing CO2 to the individual traps.

CO2 Flow Limiter at Each Trap

CO2 is supplied by the CO2 distribution station at a constant pressure that is adjusted by a reducer. The flow at each trap is ensured by a flow limiter that consists of a restriction calibrated so as to allow the desired flow to pass through depending on the input pressure. This flow limiter can be of the variable type, with a needle that can be adjusted by a screw, or of the fixed type. For example, a fixed flow limiter can consist of a sintered-metal plug, calibrated to allow the passage of a gas flow determined on the basis of the input pressure.

In a preferred embodiment according to the invention, each individual trap comprises a mosquito lure. These lures are in the form of solids or granules impregnated with acids that gradually diffuse from one to several months (for example those marketed by the Biogents Company). In another embodiment, the acids comprising the lure can be contained in a centralized receptacle and gradually diffused towards the assembly of traps, for example mixed with CO2 and using the same distribution tubes.

In another preferred embodiment, the complex mosquito trap according to the invention comprises from 4 to several dozens of individual traps.

Three different variations of topology of the CO2 distribution network can be used, depending on the number of individual traps and the configuration of the outdoor spaces to be protected. These variations are preferred embodiments according to the invention.

Star Array

Figure 1:
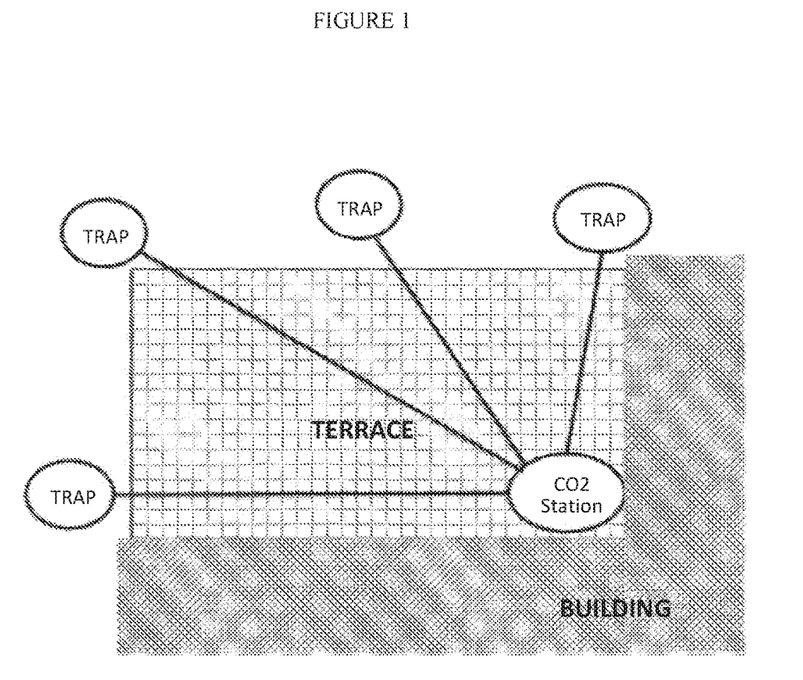
FIG. 1 is a diagram of a complex mosquito trap with a star distribution array, comprising 4 individual traps.

From the CO2 distribution station, CO2 can be distributed with the aid of a "star" array, namely an individual tube for the CO2 extending from the CO2 tank to each trap. This topology offers the advantage that a problem of CO2 distribution to a trap, for example a punctured or blocked tube, has no repercussions on the supply to other traps. This topology is shown in FIG. 1.

In-Series Array

Figure 2:
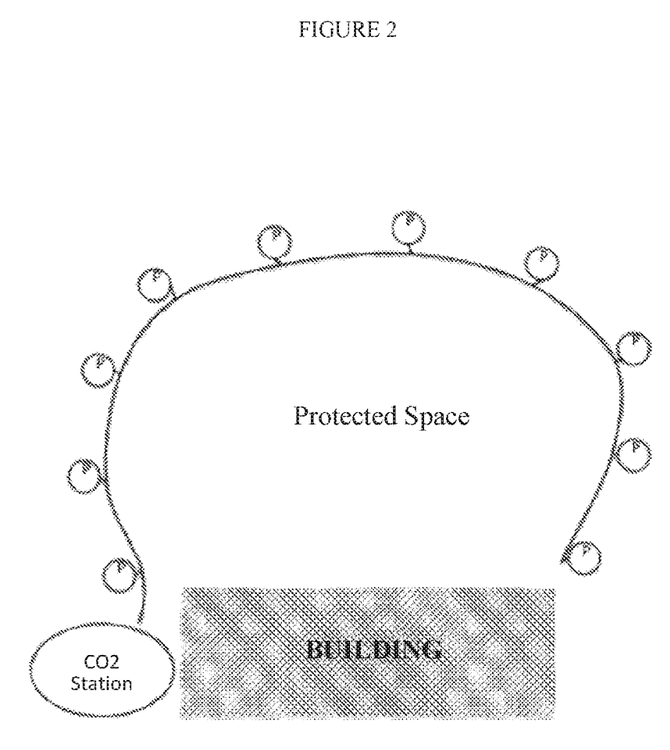
FIG. 2 is a diagram of a complex mosquito trap with an in-series distribution array, comprising 12 individual traps.

A main tube leaving the CO2 tank supplies all of the traps, each of them being supplied by a by-pass on the main tube. This topology is shown in FIG. 2.

Mixed Star/in-Series Array

The topology can also be mixed, i.e. several branches can extend either from the CO2 tank or from any point of the network. This depends on the one hand on the total extent of the separation line encircling the outdoor spaces and on the other on the arrangement of the traps.

Figure 3:
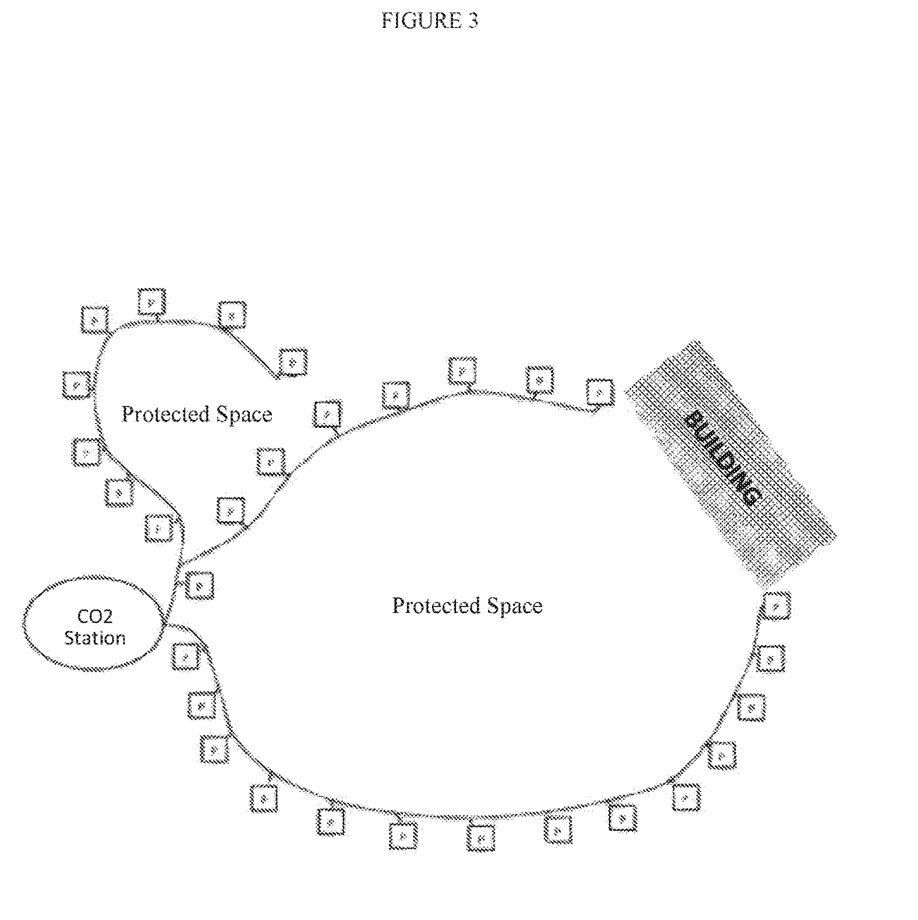
FIG. 3 is a diagram of a complex mosquito trap with a mixed star/in-series distribution array, comprising 30 individual traps.

For example, if the separation line measures several hundred meters, it is advantageous to locate the CO2 distribution station in the middle of the outdoor spaces to be protected and to create two CO2 in-series supply branches, to prevent load losses along the CO2 tube. On the other hand, depending on the arrangement of the traps, it may be useful to create on an ad hoc basis a star network at certain points of the network to avoid excessive tube lengths. An example of this topology is shown in FIG. 3.

In a preferred embodiment, the individual traps are supplied with CO2 by an in-series distribution network or a mixed star/in-series distribution network.

Global CO2 Flow Control

As the flow of each trap is controlled by an individual flow limiter, the total or centralized flow is the sum of flows of each trap. A global or centralized flow limiter is therefore advantageously positioned in the installation for two reasons:

in the event of leakage due, for example, to the rupture of a tube, in order to prevent the CO2 tank from emptying very rapidly;

to enable an economic and precise control of the variable global flow as explained below.

The principle of global flow control is to place a variable global or centralized flow limiter at the starting point of CO2 distribution to the traps. This type of limiter is based on the fact that the flow of gas through a constriction depends on the pressure difference between the downstream and upstream pressures, according to the following formulae:

$Q_n$=Gas flow at 0° C. and 1013 mbar
$P_n$=Density of gas at 0° C. and 1013 mbar
$\Delta P$=Pressure differential (bar)
$P1$=Upstream pressure (bar absolute)
$P2$=Downstream pressure (bar absolute)
$T1$=Upstream temperature (° K)
$K_v$=flow factor $(m^3 \cdot h^{-1})$ $$Kv = \frac{Q_n}{514} \cdot \sqrt{\frac{P_n \cdot T1}{\Delta P \cdot P2}}$$

If P2<P1/2

$$Kv = \frac{Q_n}{257} \cdot \sqrt{\frac{P_n \cdot T1}{P1}}$$

In a preferred embodiment according to the invention, it shall be ensured that the upstream absolute pressure of the limiter is greater than double the downstream absolute pressure: the flow obtained does not depend on the downstream pressure but only on the upstream pressure. Thus the global CO2 flow can be controlled precisely and adjusted in proportion to the cyclic opening and closing ratio of a two-position electrovalve.

Control of the global CO2 flow is achieved on the one hand by the cyclic opening/closing ratio of a two-position valve and on the other by the application of an absolute pressure of CO2 output from the control unit, and upstream of a fixed flow limiter, greater than double the downstream absolute pressure.

Thus, the complex mosquito trap according to the invention is characterized preferentially in that the centralized CO2 flow is adjusted in proportion to the cyclic ratio of a two-position electrovalve and by the application of an absolute pressure of CO2 upstream of the centralized flow limiter greater than double the absolute pressure downstream.

This characteristic can advantageously be very useful because, in the event of a large leak at some point in the network, the gas pressure in the main tube will fall, it may drop to the level of ambient atmospheric pressure. If the pressure upstream of the flow limiter is equal to double the pressure downstream in the case of normal operation, then in the event of a leak and a drop in pressure downstream of the limiter, the flow does not increase.

Thus, in this preferred embodiment, a leak will therefore have the effect of reducing the flow of CO2 to the traps but this will not empty the CO2 tank more rapidly than normal.

For example, if during normal operation the limiter's output absolute pressure must be regulated to 1.7 bar, to obtain the desired flow at the traps, the absolute pressure upstream must be set to a value in excess of 3.4 bar.

The second advantage of this limiter, used in these pressure conditions, is to enable the flow to be regulated with a simple electromagnetic valve. In fact, if a valve is opened and closed in cycles, for example 10s open and 10 s closed, it may be thought intuitively that this would divide the flow by a factor of 2. This is true if a flow limiter is positioned after the valve. Otherwise, during the period that the valve is closed, the CO2 contained in the main tube continues to flow towards the traps and the pressure in the tube drops. When the valve re-opens, in the absence of a flow limiter, the reducer refills the tube with as high a flow as permitted, until the pressure in the tube is re-established. Thus a mean flow is achieved, which is much higher than half of the flow in stable regime. By contrast, with the flow limiter regulated as explained above, the maximum flow being equal to the flow in stable regime, a mean flow proportional to the cyclic opening/closing ratio of the valve is in fact achieved.

This arrangement replaces an electronic flow regulator, using a proportional valve and control loop for this valve. This type of regulator is at least 10 times more expensive than a simple two-position electromagnetic valve.

Programming CO2 Diffusion

CO2 in a bottle represents a significant operating cost, both from the point of view of the costs of the material and the logistical cost. It is very easy to limit the periods and intensities of CO2 diffusion so as to obtain maximum efficiency for minimum consumption of CO2.

For example, if the most abundant mosquito is the "tiger" mosquito (*Aedes albopictus*), there is no point in diffusing CO2 during the night because this mosquito is only active during the day. Sunrise and sunset are the times of greatest activity of most mosquitoes (including the "tigers") so these are times when it would be necessary to diffuse CO2. It is necessary to diffuse more CO2 at times when people are present in the area to be protected, it is therefore necessary to be able to modulate the intensity of CO2 diffusion at the desired times.

Thus, in a preferred embodiment according to the invention, several devices are associated with the complex mosquito trap:
- a daily or weekly diffusion programmer enabling the time slots and intensities of diffusion to be defined for each day of the week;
- a remote control enabling diffusion to be controlled, in addition to the daily or weekly programming. This remote control is achieved either by a conventional radio frequency system, or by a portable telephone.

This function of programming $CO_2$ diffusion is performed using an electrovalve operated by an electronic programmer.

Remote Control and Remote Surveillance

Programming $CO_2$ diffusion requires on the part of the user of the complex mosquito trap according to the invention a certain understanding of the behavior of mosquitoes in order to optimize the effectiveness of protection based on its lifestyle habits. Some users, private or institutional, prefer to shift the responsibility of this programming to the service provider who installed the complex mosquito trap. Thus, in a preferred embodiment according to the invention, the $CO_2$ control unit can be controlled and programmed remotely by the installer.

This function is performed by adding a GSM (Global system for Mobile communication) module in the programming unit and a micro-controller enabling M2M (Machine to Machine communications) protocols to be managed.

The addition of this GSM module also allows remote surveillance of operation, by adding the appropriate sensors and by transmitting alarms.

For example, a pressure sensor, or pressure gauge, installed on the $CO_2$ supply circuit detects whether the $CO_2$ tank is empty in the case of bottles of compressed $CO_2$. A flow sensor or weight sensor, placed beneath the $CO_2$ tank, makes it possible to calculate what is left in the $CO_2$ tank and inform the service provider in order to anticipate $CO_2$ bottle replacements.

A discrepancy between the actual consumption of $CO_2$ and the theoretical consumption, as programmed, enables $CO_2$ diffusion problems to be detected such as, in particular, a leak or by contrast a blocked tube, and thus the service provider to be alerted.

For example, if the main tube is bent, due to removing a trap or to some other change to the array, after the first traps, the total flow becomes much weaker than expected. Or even, if a leak occurs in a $CO_2$ control unit, for example on a valve, the active tank will empty faster than the flow measurement makes it possible to predict.

An abnormal $CO_2$ output pressure of a reducer, too high or too low, thus enables a possible malfunction of a reducer or a leak to be detected and an alarm to be triggered.

Too low a $CO_2$ output pressure of the limiter is an indication of a possible leak in the main tube. By contrast, too high a pressure indicates a blockage in the main tube.

Multiple Reserves of $CO_2$

In order to avoid interruptions to the supply of $CO_2$ to the complex mosquito trap according to the invention and to facilitate the logistics of replacing or refilling bottle, or $CO_2$ tanks, it is very useful to have at least two tanks and to switch automatically from the active reserve to a second one when the first is empty. Having been warned by the remote surveillance system, the service provider can plan when to intervene.

Improvement of Trap-Modules: Two-Compartment Traps

In order to increase the traps' capture rate, for the same quantity of $CO_2$ and the same lure, a preferential embodiment is proposed regarding the way in which the $CO_2$ is diffused.

As stated above, mosquitoes have $CO_2$ sensors that enable them to detect the direction of the $CO_2$ concentration gradient so that they can get close to its source of emission. In other words, mosquitoes try to get near the point of highest concentration of the $CO_2$ and more particularly of the $CO_2$/fatty acid mixture. The aim of this preferred embodiment is precisely to increase the concentration of this mixture in the proximity of the trap, without increasing the flow of $CO_2$ or fatty acids.

Figure 4A:
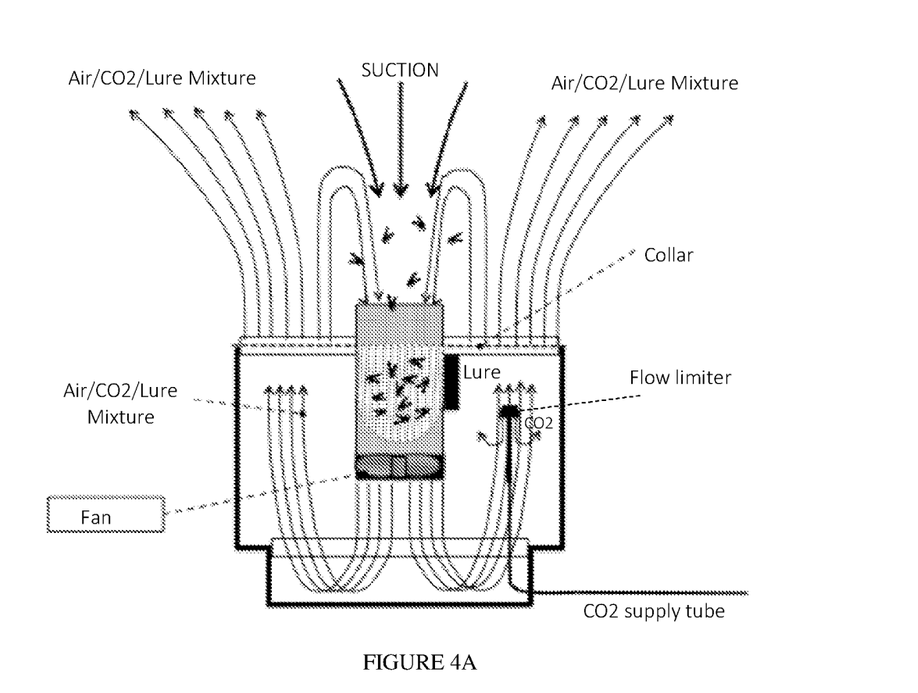

In the conventional version of the complex mosquito trap according to the invention, the suction flow created by the fan causes an overpressure inside the trap body, which is closed at the bottom and sides, and exits through a grid that closes the trap from above. The $CO_2$ is conveyed by a tube into the trap and the "lure", composed of fatty acids, is also located in the trap, near the airflow. In this way, it is a mixture of air/$CO_2$/lure that passes through the grid. This grid is calibrated so that the airflow is sufficiently slow in order not to oppose the approach of the mosquitoes. A diagram of this individual trap, with 1 compartment, appears in FIG. 4.

Figure 4B:
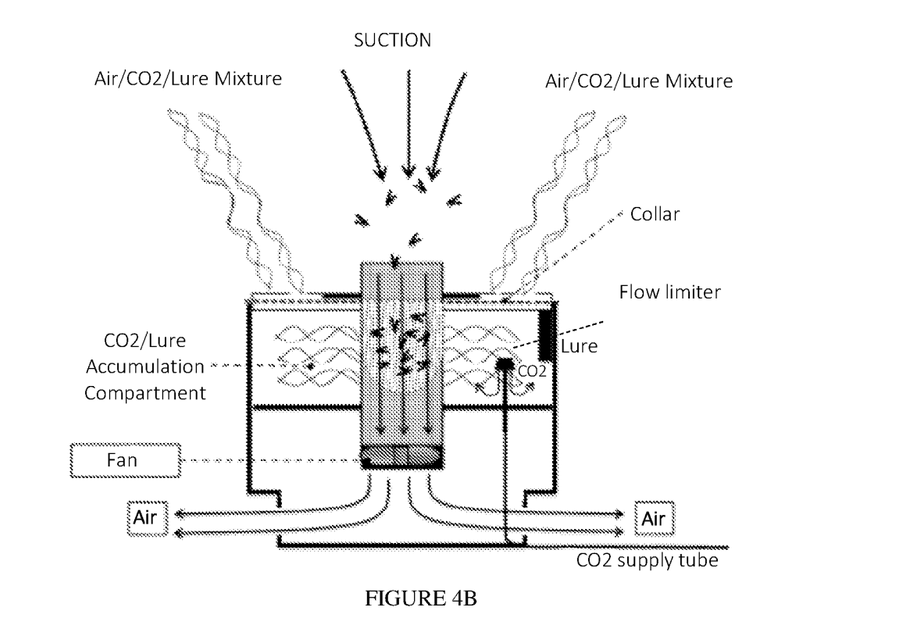

In a preferred embodiment according to the invention, the improvement of this trap consists in dividing the interior of the trap into two compartments, top and bottom, as show in the diagram in FIG. 4B. In the top compartment, there is no longer any significant airflow, only the $CO_2$ supply being present. Consequently, there is an accumulation of molecules of $CO_2$ and fatty acids from the lure. These molecules end up escaping from the top of the trap, through the grid. The advantage of this 2-compartment embodiment is that the concentrations of $CO_2$ and molecules of fatty acids at the surface of the grid are much greater than in the conventional arrangement. This therefore further incites the mosquitoes to approach the surface of the grid and suction cone and thus increases the capture rate. The bottom compartment is provided with sufficiently large orifices for the fan flow to circulate, without creating overpressure in the compartment. In this way, said fan produces a greater flow than in the preceding arrangement. This also increases the rate of capture. A solid disc is placed round the suction cone so as to reduce the quantity of $CO_2$/lure mixture conveyed by the suction flow. The long-distance attraction effect and the barrier effect remain unchanged because the same quantity of $CO_2$ and lure is emitted by each trap.

Lastly, another aim according to the invention is the use of a complex mosquito trap according to the invention to eliminate mosquitoes present in an outdoor space and to prevent more mosquitoes from penetrating therein.

The basic characteristics according to the invention and the preferred embodiments have been described above. An explanation of the method of operation of the protective dual action of the complex mosquito trap according to the invention is given below.

The attractive power of $CO_2$ operates up to several tens of meters away from its point of emission, in the order of 70 to 80 m. The fatty acids have an attractive action, particularly when combined with $CO_2$, at a shorter distance, in the order of a few meters.

If there are no people within the outdoor spaces to be protected, the traps attract the mosquitoes located both inside and outside these spaces, depending on wind direction. As the traps encircle the outdoor spaces along the separation line, whatever the wind direction, the mosquitoes will be attracted to its periphery and captured by the traps. The outdoor spaces will gradually empty of any mosquitoes that may be present there.

When there are one or more people in the outdoor spaces to be protected, the CO2 emitted by the people, plus that emitted by the traps, will attract any mosquitoes that may be located outside the space. When the mosquitoes follow the CO2 corridors, they will fatally move towards the line of traps. Although the distance between the traps and the CO2 flow from each trap respect the characteristics according to the invention, the combined odor of CO2 and lure give the mosquitoes the illusion that the prey that they have detected from afar is in the traps. They will stay round the traps, try to get as close as possible to the false prey to sting it and end up by getting caught.

Example of Protection Against Tiger Mosquitoes, in Summer, of a Terrace

A terrace is delimited on the north side by a house, on the east side by a pond with lots of vegetation, on the south side by a vast expanse of lawn and on the west side by vegetation.

The line of traps starts at the SE end of the house and ends at the SW end. On the east side, with the risk of a high density of mosquitoes, 5 traps will be arranged, 5 m apart. On the south side, unlikely to harbor large colonies of mosquitoes, 5 traps will be arranged, 10 m apart, and on the west side, 5 traps will be arranged, 7.5 m apart.

CO2 diffusion will be programmed on the basis of the use of the terrace by people and the periods of maximum activity of the mosquitoes.

For example, CO2 will be diffused at sunrise, for an hour, because this corresponds to a period of mosquito activity. However, at this time in the morning, nobody is on the terrace so a moderate flow is sufficient to capture the mosquitoes, without having to protect people. The total flow is limited to 75 g/hour, i.e. 75/15=5 g/hour/trap, which corresponds to 5/5=1 g/h/m for the traps in the SE, 5/10=0.5 g/h/m for the traps located to the south and 5/7.5=0.67 g/h/m for the traps in the SW.

Diffusion then resumes at 10.00 until 14.00, with a total flow of 150 g/hour, i.e. 10 g/h/trap because people use the terrace during this period and the mosquitoes are relatively active (the calculation of the individual flow of each trap in terms of g/h/m is calculated as previously described).

Then, between 14.00 and 16.00, diffusion continues at 75 pour, i.e. 5 g/h/trap, because the mosquitoes are less active during the hottest hours of the day. Then, between 16.00 and 18.00, the flow is increased to 10 g/h/trap (150 g/h total flow) because the mosquitoes become more active, and the flow could also be increased to 15 g/h/trap (total flow 225 g/h) between 18.00 and 21.00, which corresponds to the time for cocktails and dinner on the terrace.

Finally, CO2 diffusion is stopped after 9.00 and sunset.

In a possible embodiment, for these different cases of operation, the flow regulator using a 2-position electrovalve is adjusted as follows:
  reducer adjusted to 3.5 bar absolute pressure;
  central flow limiter adjusted to 300 g/hour of CO2 when the valve is continuously open;
  the absolute pressure downstream of the flow limiter is set at 1.7 bar.

Cycle 4 s open 16 s closed, to obtain a flow of 75 g/hour, 10 s open and 10 s closed to obtain 150 g/hour, 15 s open and 5 s closed to obtain 225 g/hour.

The invention claimed is:

1. A complex mosquito trap for outdoor spaces comprising:
   several individual traps in an array supplied with $CO_2$, said individual traps being solid devices of the appropriate form for attracting and catching mosquitoes and being arranged along a separation line separating potential mosquito sources from the outdoor spaces to be protected;
   a $CO_2$ distribution station comprising a $CO_2$ source and a $CO_2$ control unit that comprises a central flow limiter distributing $CO_2$ to the individual traps by an array of tubes, and
   a low-voltage distribution network comprising one or more transformers and electrical wires supplying the individual traps,
   wherein:
   a distance between individual adjacent traps of said individual traps does not exceed 12 meters,
   a $CO_2$ flow in each individual trap between 1 and 2.5 g/h per meter of distance between the adjacent traps of said individual traps, and
   and a flow limiter is provided in each trap of said individual traps.

2. The complex mosquito trap according to claim 1, wherein each individual trap also comprises a mosquito lure.

3. The complex mosquito trap according to claim 1, wherein the individual traps are supplied with CO2 by the array of tubes which comprises an in-series distribution network or a mixed in-series/star distribution network.

4. The complex mosquito trap according to claim 1, wherein the $CO_2$ source comprises one or two tanks of compressed $CO_2$.

5. The complex mosquito trap according to claim 1, wherein the $CO_2$ source comprises a device capable of producing $CO_2$ from ambient air.

6. The complex mosquito trap according to claim 1, wherein the central flow limiter comprises a two-position electrovalve and adjusts the $CO_2$ flow to the individual traps in proportion to a cyclic opening and closing of the two-position electrovalve and by application of an absolute pressure of $CO_2$ upstream of the central flow limiter greater than double an absolute pressure downstream.

7. The complex mosquito trap according to claim 1, wherein each individual trap comprises two separate compartments enabling a concentration of the $CO_2$ and a mosquito lure at a surface of said individual trap.

8. The complex mosquito trap according to claim 1, wherein the complex mosquito trap eliminates mosquitoes present in an outdoor space and prevents more mosquitoes from penetrating therein.

* * * * *